Patented Oct. 6, 1953

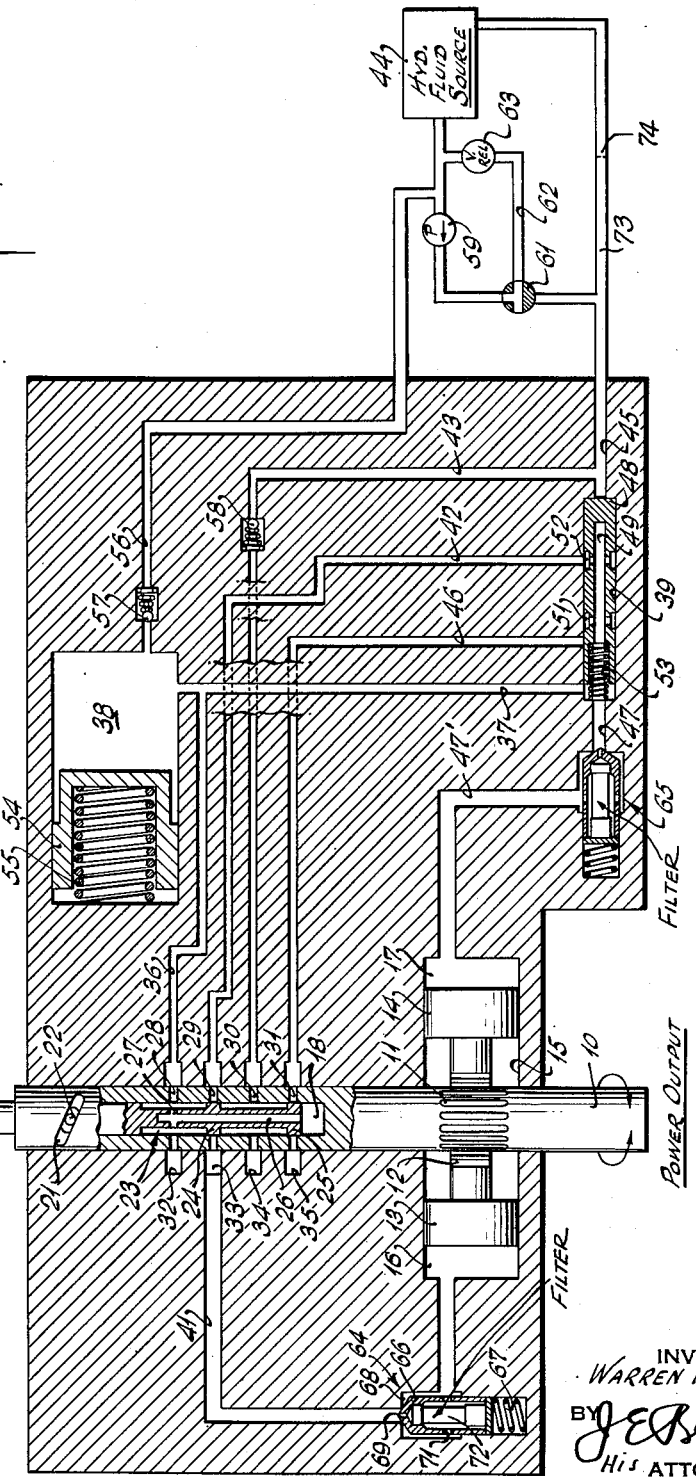

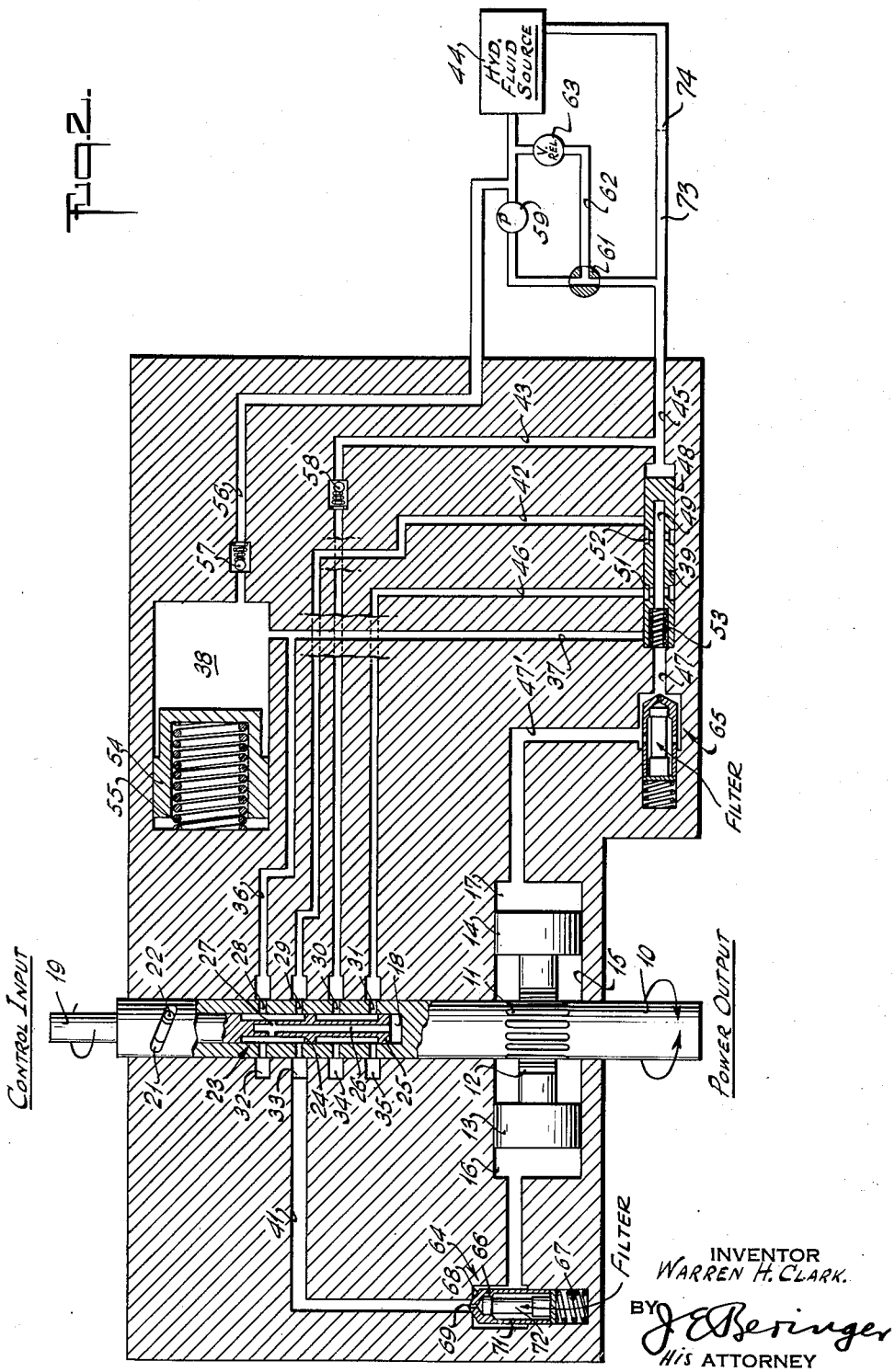

2,654,347

UNITED STATES PATENT OFFICE 2,654,347

COMBINED POWER STEERING AND SHIMMY DAMPENING

Warren H. Clark, Glendale, Calif., assignor to United Aircraft Products, Inc., Dayton, Ohio, a corporation of Ohio Application September 8, 1950, Serial No. 183,862

4 Claims. (Cl. 121—41)

This invention relates to power steering and shimmy dampener apparatus, particularly as combined in a unitary structure.

An object of the invention is to condition the apparatus for alternative use as a shimmy dampener or power steerer simply by adjustment of a single control.

Another object of the invention is to present a hydraulic circuit for combined power steering and shimmy dampening, utilizing two slide valves for control thereof, one of said valves functioning as a control element to shift the operational character of the circuit from power steering to shimmy dampening and vice versa.

A further object of the invention is to accomplish power steering through apparatus functioning as a servo-mechanism with mechanical follow-up.

Other objects and structural details of the invention will appear from the following description when read in connection with the accompanying drawings, wherein:

Fig. 1 is a view, in part diagrammatic, of the apparatus as set for shimmy dampening operation; and Fig. 2 is a view similar to Fig. 1, showing the apparatus as set for power steering.

Referring to the drawings, a rotatable power output shaft 10 is formed with gear teeth defining a pinion 11 meshing with a rack 12. The rack 12 is a part of a piston assembly comprising interconnected pistons 13 and 14 reciprocable in a cylinder 15. The pistons 13 and 14, together with the ends of the cylinder 15, define respective pressure chambers 16 and 17.

The pinion 11 is located adjacent the outer end of the shaft 10. The opposite or inner end thereof is formed with a bore 18 to receive a control input shaft 19 arranged for relative rotary and axial motions. A spiral slot 21 in the shaft 10 receives a pin 22 in the shaft 19, the construction and arrangement being such that relative rotary motion between the shafts 10 and 19 results in an axial movement of the shaft 19. The inner end of the shaft 19 is constructed as a slide valve 23 having annular flanges 24 and 25 and a bore 26 opening at its one end into the bottom of bore 18. At its opposite end the bore 26 communicates through radial ports 27 with the bore 18 at a point outwardly of or above the flange 24.

The slide valve 23 controls a series of radial ports 28, 29, 30 and 31 in the shaft 10 which ports register with respective annular grooves 32, 33, 34 and 35. Communicating with the groove 32 is a passage 36 leading to a passage 37, the latter being connected at its one end to a fluid reservoir 38 and at its other end to a chamber 39. The groove 33 is connected by a passage 41 to the pressure chamber 16 and by a passage 42 to the chamber 39. The groove 34 is connected by a passage 43 to a source 44 of hydraulic pressure fluid, a branch 45 of the passage 43 communicating with the chamber 39. The groove 35 is connected to the chamber 39 by a passage 46.

Also connected to the chamber 39 is a passage 47 communicating with the pressure chamber 17. The passage 47 and branch passage 45 open into the opposite ends of the chamber 39. The several passages 37, 42 and 46 communicate with the side of the chamber in longitudinally spaced relation to one another.

Mounted for limited axial motion in the chamber 39 is a slide valve 48 presenting a central bore 49 and longitudinally spaced radial ports 51 and 52, the bore 49 opening into the left hand end of chamber 39. A spring 53 urges the valve 48 to a seat in the right hand end of the chamber 39.

The reservoir 38 contains a piston 54, bearing the thrust of a spring 55, and functions as a hydraulic accumulator. A passage 56, containing a check valve 57, connects the reservoir or accumulator to the hydraulic fluid source through passage 43. As influenced by the accumulator, therefore, the pressure in the system is that established by the resistance of check valve 57.

The passage 43 has therein an oppositely facing (with respect to valve 57) check valve 58, as well as a pump 59 and a two-way valve 61. The pump 59 may for purposes of description be considered a continuously operating pump while the valve 61 is manually or otherwise settable to a first position in which the output of pump 59 is circulated through a by-pass 62 and to a second position in which the pump output is admitted to passage 43 while continuing to have access to the by-pass 62. A pressure relief valve 63 in the by-pass 62 permits flow through the by-pass only at a predetermined high pressure value, which value is higher than the pressure value at which check valve 58 opens.

The passages 41 and 47, communicating with pressure chambers 16 and 17 contain identical restrictor valves 64 and 65. In structural detail, and referring to valve 64, each of these valves comprises a tubular, plunger type valve 66 urged by a spring 67 to a seat in a chamber 68, the chamber 68 being interposed in the passage 41. A small opening 69 in the end of valve 66, and radial ports 71 therein establish continuous communication through the valve. A filter 72 is mounted in the valve 66 so that fluid flow occurring between opening 69 and ports 71 must pass through the filter. In the arrangement of the valves 64 and 65, the valve members 66 face outward or away from the chambers 16 and 17. Thus fluid flowing from the chambers must pass through the restricted passage represented by ports 71, filter 72 and opening 69. Fluid flowing in the opposite direction, however, may unseat valve members 66 and pass freely to the chamber 16 or 17.

In the operation of the apparatus as a shimmy dampener, the parts occup the positions shown in Fig. 1. Thus, the slide valve 23 is in a neutral position with the flanges 24 and 25 thereon blocking the ports 29 and 31. Thus even though fluid from the source 44 should be admitted to the bore 18 it is denied escape therefrom. The valve 61 is, however, set at this time to by-pass the entire output of pump 59. The slide valve 48 is in its extreme right hand position, with radial port 52 registering with passage 42 and radial port 51 offset from the passage 46 which accordingly is closed. Passage 37 is, in this position of the valve, open for communication with passage 47 and bore 49.

Torque impulses applied to the shaft 10 are transmitted to the piston assembly 12—13—14 in the form of an axial thrust. Assuming this thrust to occur in a leftward direction, the pressure in chamber 16 rises forcing fluid out passage 41 and past valve 64 by way of ports 71 and opening 69, the restriction to flow thus imposed effectively damping the movement of the piston assembly. The chambers 16 and 17 are in communication with one another and with the accumulator 38, passage 41 being connected through groove 33 with passage 42 which, as has been seen, is connected through port 52 and bore 49 with passage 37 leading to accumulator 38 and with passage 47 leading to chamber 17. As fluid is forced out of one chamber 16 or 17 by motion of the piston assembly, therefore, a like amount of fluid is admitted to the other chamber, the valve element 66 yielding for free flow of the make-up fluid.

In the operation of the apparatus for power steering, the valve 61 is set as shown in Fig. 2, to direct pressure fluid from the pump 59 through the passage 43. Having access through branch passage 45 to the end of valve 48, the pressure fluid moves valve 48 to a seat in the left hand end of chamber 39 as shown in Fig. 2. As so positioned, the port 51 communicates with passage 46, bore 49 communicates with passage 47 and passages 37 and 42 are closed.

The rotation of control input shaft 19 out of the position of Fig. 1 is effective through slot 21 and pin 22 to raise or lower the slide valve 23. Assuming the input shaft to have been turned in a direction to move the pin 22 rightward in the slot 21, the slide valve 23 is lowered, as seen in Fig. 2. As a result, the flanges 24 and 25 move out of their neutral blocking positions and take up other positions wherein ports 28 and 29 communicate with one another and ports 30 and 31 communicate with one another. Thus the pressure fluid in passage 43 is admitted through groove 34 and ports 30 to the chamber 18 and flows out of the chamber by way of ports 31 and groove 35 to passage 46. From passage 46 the pressure fluid is directed through ports 51 and bore 49 in valve 48 to the passage 47 and is conducted thereby to the pressure chamber 17. The elevated pressure in chamber 17 serves to move the piston assembly 12—13—14 leftward whereupon shaft 10 is turned in the direction of the left hand directional arrow at the lower end of shaft 10. Such motion of the piston assembly serves to displace fluid from the chamber 16, which fluid passes to the accumulator 38 by way of passage 41, groove 33, ports 28, groove 32 and passage 36. The described turning motion of the output shaft 10 is effective through slot 21 and pin 22 to raise the slide valve 23. When, in response to such motion, the slide valve is restored to the neutral position of Fig. 1, flow through the slide valve from passage 43 is interrupted and the pressure fluid actuation of shaft 10 accordingly is discontinued. It will be understood that a reverse direction of rotation of the shaft 19 will have a reverse effect, that is it will connect the chamber 16 to the pressure supply line 43 and will connect the chamber 17 to the accumulator. In the latter regard, it will be noted that if the slide valve 23 is raised from its Fig. 1 position, the passage 46 opens into the bottom of bore 18 and so communicates through bore 26, ports 27, ports 28 and groove 32 with passage 36 leading to the accumulator 38. It will further be understood that the control input shaft 19 is operator or pilot controlled and can be turned at any rate and in any degree that may be required. The output shaft 10 will duplicate such motion and will at the same time restore the slide valve 23 to a neutral position so that the apparatus may be conditioned for the next movement of the control input shaft.

With regard to pump 59 and valves 61 and 63 it will be understood that these elements are merely illustrative of one arrangement for supplying fluid under pressure to the passage 43. Other arrangements are of course possible, the requirement being merely that pressure be supplied the passage 43 for power steering and be discontinued for shimmy dampening. In connection with the discontinuing of such pressure supply, the passage 45 may be connected, as shown, by a passage 73, incorporating a restriction 74, with the source 44 of hydraulic pressure. This passage will simplify return of the slide valve 48 to the position of Fig. 1 when the valve 61 is adjusted from its Fig. 2 to its Fig. 1 position.

In power steering, wherein added fluid is forced into the accumulator, and on account of rising temperature, the pressure in chamber 38 tends to rise. Such rise is kept to a maximum value by the check valve 57 which allows excess fluid to return through passage 56 to the inlet side of pump 59.

What is claimed is:

1. Power steering apparatus, including a rotatable power output shaft, a control input shaft arranged for rotary and axial motions, said input shaft being received in one end of said output shaft, pin-in-slot connection between said input shaft and said output shaft resolving a relative rotary motion between said shafts into an axial motion of said input shaft, and a hydraulic servo-motor for rotating said output shaft, said motor including a slide valve on the inner end of said input shaft.

2. In a combined shimmy dampener and power steering apparatus, a rotary power output shaft, a pinion on said shaft, a rack meshing with said pinion, pistons on the ends of said racks, pressure chambers receiving said pistons, a pressure fluid source and a reservoir, said chambers being filled with fluid from said reservoir, restrictor valves inhibiting escape of fluid from said chambers, a control input shaft in telescoping relation to said output shaft and arranged for relative rotary and axial motions, a connection between said shafts providing for axial motion of said input shaft in response to relative rotary motion of said shafts, a slide valve constructed as an extension of said input shaft, passages extending from said pressure chambers and connected by said slide valve alternatively to said pressure fluid source and said reservoir, another valve to connect said passages to said reservoir, said other valve being settable to an ineffective position wherein fluid flow is controlled by said slide valve, and a pressure fluid connection from said source to set said other valve to ineffective position.

3. A combined power steering and shimmy dampening apparatus, including a rotatable power output shaft, a control input shaft in telescoping relation to said output shaft and having a pin-in-slot connection therewith resolving a relative rotary motion between said shafts into an axial motion of said input shaft, a hydraulic fluid reservoir and a source of hydraulic fluid under pressure, a pressure fluid operated piston connected to said output shaft, a slide valve connected to said input shaft for effecting alternating connections between said piston and said reservoir and said pressure fluid source, said slide valve having neutral position in which pressure fluid from said source is denied access to either side of said piston, and a second slide valve settable to a position communicating said reservoir with both sides of said piston.

4. A combined power steering and shimmy dampening apparatus, including a power output shaft, a piston assembly positively connected to said shaft alternatively to assume a driving and driven relationship thereto, a closed hydraulic circuit receiving said piston assembly and damping the motion thereof transmitted by rotational impulses of said output shaft, said circuit having opposite sides as defined by said piston assembly, selectively operable means for admitting fluid pressure to said circuit, a slide valve to control the application of such pressure to said piston assembly to apply rotational force to said output shaft, a control input shaft for adjusting said slide valve, a mechanical follow up connection between said output shaft and said slide valve for adjusting said slide valve in correspondence with the movements of said output shaft, a second slide valve in said circuit, and a reservoir communicating through said second slide valve with the opposite sides of said circuit, said second slide valve being operable by fluid admitted by said selectively operable means to condition said circuit for power steering under the control of the first said slide valve.

WARREN H. CLARK.

References Cited in the file of this patent

UNITED STATES PATENTS

| Number | Name | Date |
|---|---|---|
| 1,467,209 | Sumner | Sept. 4, 1923 |
| 1,894,098 | Janisch | Jan. 10, 1933 |
| 1,905,065 | Scholl | Apr. 25, 1933 |
| 2,227,375 | Carlson | Dec. 31, 1940 |
| 2,261,444 | Neubert, Jr. | Nov. 4, 1941 |
| 2,350,229 | Harrington | May 30, 1944 |
| 2,368,135 | Hamill | Jan. 30, 1945 |
| 2,418,325 | Wassall et al. | Apr. 1, 1947 |